US012743477B1

(12) United States Patent
Omidvar Tehrani et al.

(10) Patent No.: US 12,743,477 B1
(45) Date of Patent: Sep. 22, 2026

(54) COOKIE-LESS NETWORK ENVIRONMENT AND USE OF COHORTS FOR ANONYMOUS TRAFFIC APPROXIMATION

(71) Applicant: Amazon Technologies, Inc., Seattle, WA (US)

(72) Inventors: Behrooz Omidvar Tehrani, Santa Clara, CA (US); Hungjen Wang, Scarsdale, NY (US); Vykunth Ashok, Bellevue, WA (US); Kirtan Modi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1035 days.

(21) Appl. No.: 17/951,605

(22) Filed: Sep. 23, 2022

(51) Int. Cl.
*G06F 16/957* (2019.01)
*G06Q 30/0201* (2023.01)
*G06Q 30/0204* (2023.01)

(52) U.S. Cl.
CPC ..... *G06F 16/9577* (2019.01); *G06Q 30/0201* (2013.01); *G06Q 30/0205* (2013.01)

(58) Field of Classification Search
CPC ............ G06F 16/9577; G06Q 30/0201; G06Q 30/0205
USPC ............ 715/234
See application file for complete search history.

(56) References Cited

U.S. PATENT DOCUMENTS 6,556,983 B1 * 4/2003 Altschuler ............ G06F 16/907 707/E17.011
12,248,856 B2 * 3/2025 Lahav .................... G06N 5/046
2003/0101454 A1 * 5/2003 Ozer ...................... G06Q 30/02 725/35
2009/0164949 A1 * 6/2009 Henkin .................. G06Q 30/02 715/862
2010/0325557 A1 * 12/2010 Sibillo .................. G06F 16/954 715/751
2016/0140626 A1 * 5/2016 Agarwal ............ G06Q 30/0276 715/234
2017/0208370 A1 * 7/2017 Ray .................... H04N 21/2543
2020/0410553 A1 * 12/2020 Watson .................. G06N 20/00
2021/0374192 A1 * 12/2021 Krishnaprasad .... G06F 16/9535
2023/0047383 A1 * 2/2023 Yushkina ............ G06F 16/9574
2023/0140020 A1 * 5/2023 Parameswar ...... G06Q 30/0271 705/14.53
2023/0350933 A1 * 11/2023 Frikha ..................... G06F 16/35
2024/0378635 A1 * 11/2024 Demsey ............. G06Q 30/0244

* cited by examiner

*Primary Examiner* — Stephen S Hong
(74) *Attorney, Agent, or Firm* — Kilpatrick Townsend & Stockton LLP

(57) ABSTRACT

A system receives a request for content insertion in a web page for presentation at a device. The request includes contextual information about web traffic between the device and a web server, and the request excludes an identifier of a user of the device. The system associates the request with a cohort that represents a set of previous content insertion requests and characterized by a set of attribute values. The system determines a property of the cohort. The property indicates a count of previously presented content or a decision regarding blocking a future insertion of the content. The system determines that the content can be inserted in the web page. The system sends to the web server in response to the request, an indication to insert the content in the web page. The indication causes the content to be shown in the web page upon presentation at the device.

20 Claims, 11 Drawing Sheets

710
Generate a set of cohorts

720
Receive a request for content insertion in a document to be presented at a device 730
Associate the request with a cohort of the set of cohorts 740
Determine that content can be inserted in the document based at least in part on a property of the cohort 750
Transmit an indication to insert the content in the document 810
Receive historical content insertion requests 820
Determine attribute values for each historical content insertion request based on contextual information of the historical content insertion requests 830
Represent sets of attribute values with nodes in a graph 840
Determine an absurdity of a node 850
Remove the node and any child nodes therefrom from the graph 860
Store the graph, where each node corresponds to a cohort

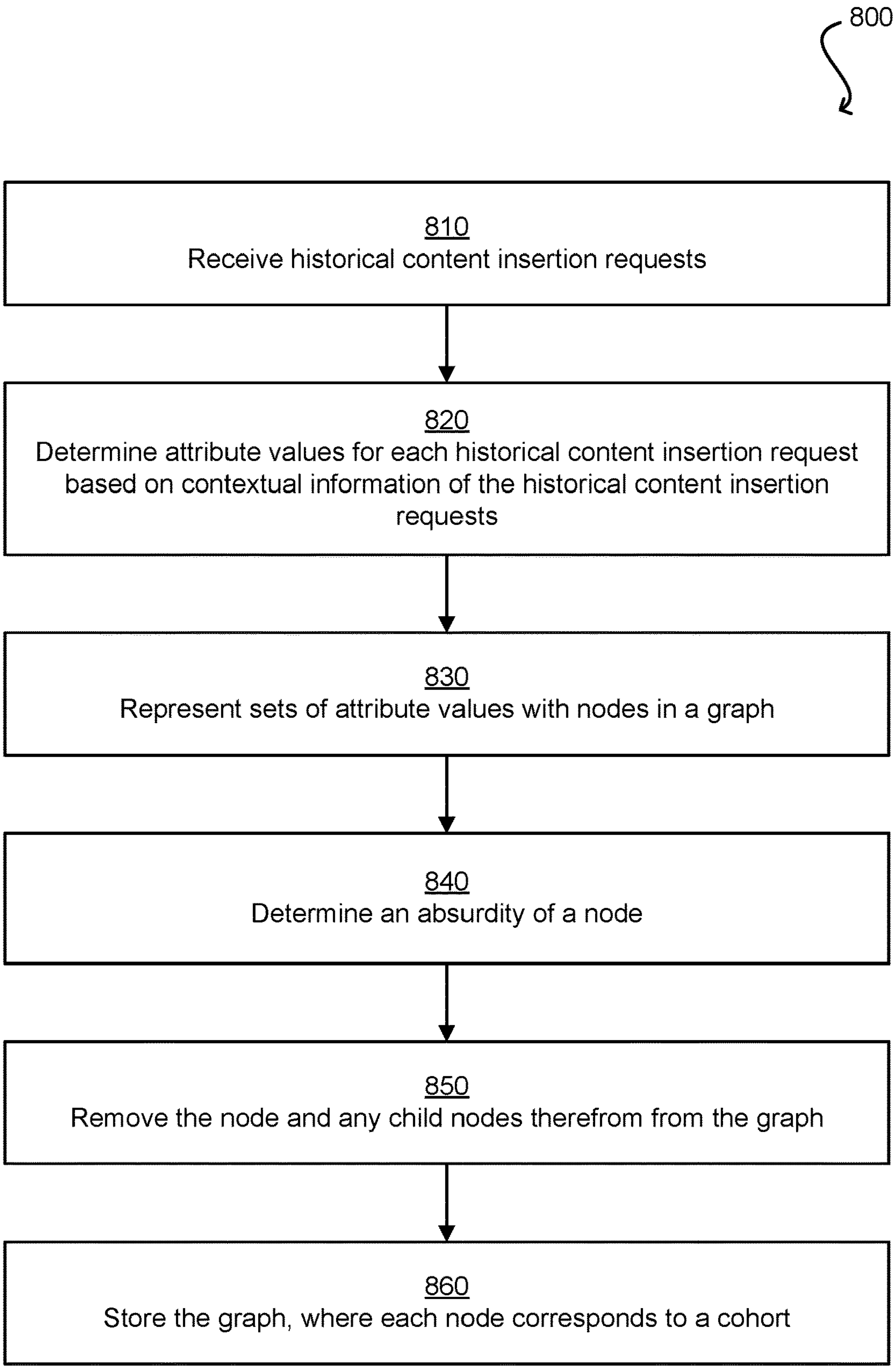

FIG. 8

COOKIE-LESS NETWORK ENVIRONMENT AND USE OF COHORTS FOR ANONYMOUS TRAFFIC APPROXIMATION

BACKGROUND

Services can be provided through online systems with various processing components. Various methods may be used to perform a service. In an example, performing the service may depend on an identification of an entity requesting the service. However, in certain situation, the identification may not always be available.

BRIEF DESCRIPTION OF THE DRAWINGS

Various embodiments in accordance with the present disclosure will be described with reference to the drawings, in which:

FIG. 8 illustrates an example flow of a process for generating cohorts, according to an embodiment of the present disclosure;

DETAILED DESCRIPTION

Figure 1:
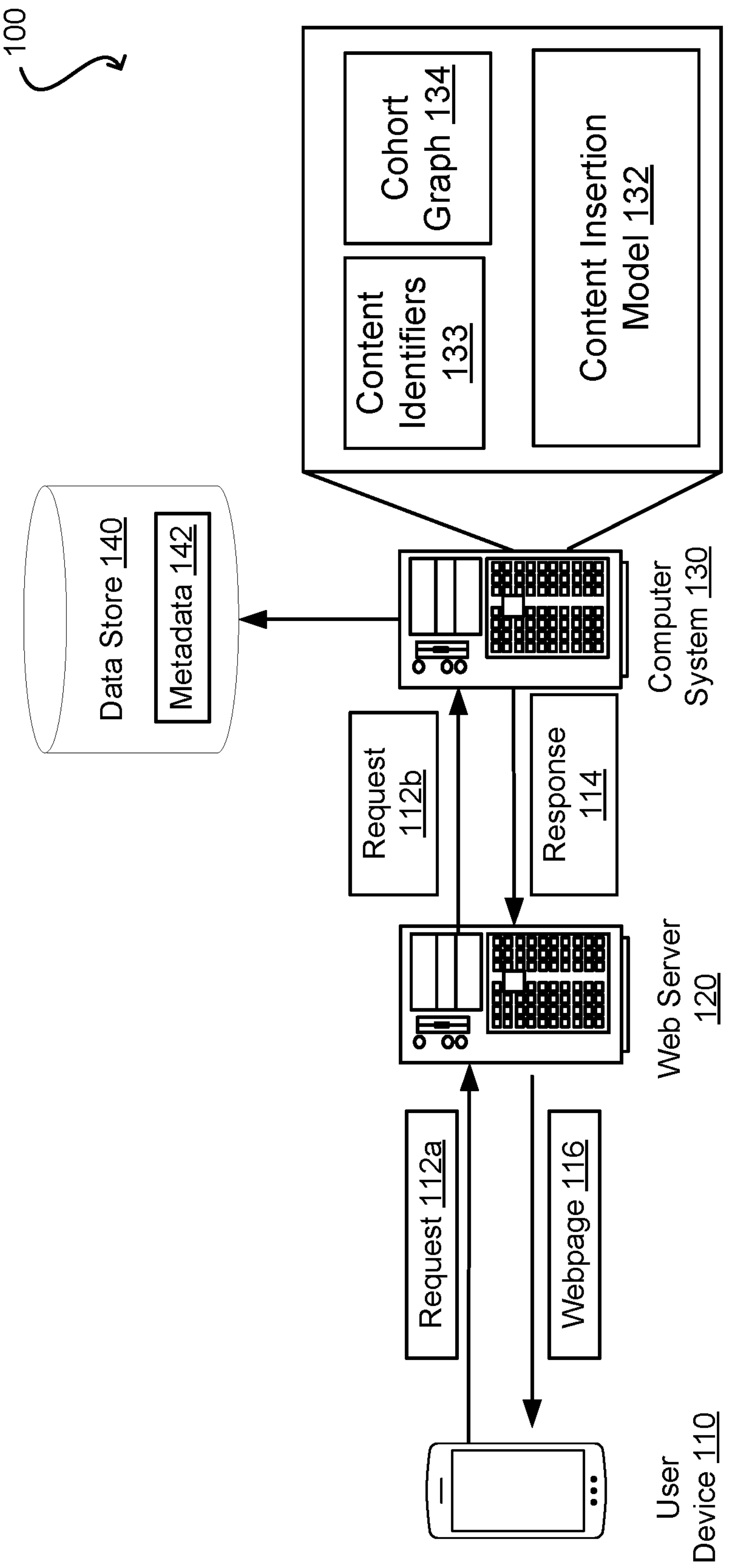
FIG. 1 illustrates an example of a network environment for web traffic processing, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, anonymous traffic approximation using cohorts in, for example, a cookie-less network environment. In an example, a computer system receives a request to insert content in a web page to be presented at a user device. The request includes contextual information about web traffic between the user device and a web server from which the request originated. The contextual information may not include a user identifier (e.g., due to the cookie-less environment), so the web traffic may be considered anonymous web traffic. Additionally, the computer system associates the request with a cohort selected from a set of cohorts. The cohort represents previous content insertion requests and is characterized by attribute values corresponding to the previous content insertion requests. The computer system determines a property of the cohort such that the property indicates at least one of a count of content previously inserted or a decision to block or unblock a further insertion of the content. Thus, the computer system determines that the content can (or cannot) be inserted in the web page based on the property and the cohort. In response to the determining that the content can be inserted in the web page, the computer system sends an indication to insert the content in the web page. The indication causes the content to be presented in the web page upon presentation at the user device.

To illustrate, consider a web server that provides web pages. A user can use a user device, such as a personal computing device and the like, to request a web page. In some examples, the web server is communicatively coupled to or is configured to make various calls to a computer system, which can manage content presentation frequency. The user may experience content fatigue with a particular content after a particular number of exposures to the particular content. For example, the computer system can store an attribute for the particular content indicating that exposure thereto more than three times should not be allowed. The web server, in response to receiving the request for the web page, transmits a request to the computer server for determining content to be inserted in the web page. This request may, but need not, identify the particular content. A user identifier may not be available in the request. This may be the case when the web traffic between the user device to the web server is anonymous. Different reasons can exist for the anonymous web traffic including, for instance, a cookie-less web environment (e.g., no cookies being stored at the user device), no user login to a web site that includes the web page, no user login to the user device, etc. The request can instead include contextual information that include values of attributes related to, for example, the user device, the web browser, the data network, the web server, the web page, the space in the web page for the content, etc. The computer system uses this contextual information to match the request with a set of cohorts, each cohort representing one or more content insertion requests characterized with the same attribute values. Each cohort may also be associated properties specific to the particular content. For a cohort, its associated properties can indicate how many times the particular content has been shown in response to the content insertion requests and/or whether to block or not future insertion of the particular content. Based on the matched cohort(s), the computer system determines whether to block the particular content from being inserted into the web page. For example, the attribute of the particular content can specify that it can only be shown five times in a twenty-four hour period. A matched cohort can be associated with properties showing that this maximum threshold number has been reached. Accordingly, the computer system can determine that the particular content cannot be inserted. Otherwise, a positive insertion determination is made.

Embodiments of the present disclosure may provide technical improvements over conventional techniques for online services. For example, the techniques disclosed herein can be used in a cookie-less network environment or any other network environment where anonymous traffic occurs. Conventional techniques rely on the identifiers for web traffic approximation and content insertion and may limit the functionalities of the online service when anonymous traffic occurs. In contrast herein, the full range of online service functionalities can be supported even when the anonymous traffic occurs because requests can be approximated using cohorts. Additionally, functioning of web servers and other servers are improved with the techniques disclosed herein since the techniques do not require cookies to be installed or logins to occur to properly function. The techniques can also be performed in real-time such that the impact to web page loading is not noticeable to end users. Additionally, while the techniques facilitate anonymous traffic approximation, the techniques are compatible with non-anonymous traffic (e.g., known traffic using cookies or logins) such that backward compatibility and mixed use of anonymous and non-anonymous traffic is supported.

In the interest of clarity of explanation, various embodiments are described herein by using the illustrative use case of web servers, web traffic, and web pages. However, the embodiments are not limited as such and similarly apply to any online service between a client (e.g., a user device, an IoT device, a sensor device, etc.) and a server. For instance, the embodiments similarly and equivalently apply to traffic between the client and the server, where the traffic relates to access to an online service provided by the server (e.g., to application traffic between an application on the client and the server, where this traffic may use an application programming interface (API) call).

In the context of a web page, an online service can involve providing content for insertion in the web page. In one particular use case, the content can be targeted content (e.g., an advertisement), in which case the request for content insertion can be referred to as an impression request.

FIG. 1 illustrates an example of a network environment 100 for content web traffic processing, according to an embodiment of the present disclosure. As illustrated, the network environment 100 includes a user device 110, a web server 120, and a computer system 130, though the network environment 100 can include any other suitable components (e.g., additionally or alternatively to those illustrated) for content insertion request processing. The user device 110 is communicatively coupled to the web server 120, which is communicatively coupled to the computer system 130. In some examples, components that are communicatively coupled can communicate, such as by sharing data, etc., with one another via one or more networks such as a local area network, a wide area network (e.g., the Internet), or the like.

The user device 110 may be or include a personal computer, a mobile computing device, a wearable device, a laptop computer, a tablet computer, or the like. The user device 110 can include multiple types of input and output modalities for requesting and/or outputting content. Illustrated herein is a web request via a graphical user interface (GUI), where content is presented as part of a web page on also the GUI. However, the embodiments are not limited as such and can include any or a combination of content being requested via a voice user interface (VUI) of the user device 110 and/or presented via the VUI. A user can provide input to the user device 110 that can generate a request 112*a* based on the input and transmit the request 112*a* to the web server 120. In some examples, the request 112*a* includes a web request to access a web page. The web server 120 can associate the request 112*a* with contextual information relate to the user device 110 (e.g., a geographic location, an internet protocol (IP) address, a type of the user device, a type of the used web browser, etc.), the requested web page (e.g., its URL, the type of content it shows, web space for the additional content that can be inserted, etc.), the web server 120 itself, a network used to connect the user device 110, etc. In some examples, the request 112*a* may also, but need not, indicate user identification, such as one or more cookies or logins are used.

The web server 120 includes a server cluster, server farm, other arrangements of servers or computing devices, or the like. In some examples, computing entities, such as social media platforms, etc., are used additionally or alternatively to the web server 120. The web server 120 receives the request 112*a* and can generate a subsequent request 112*b* based on the request 112*a*. The subsequent request 112*b* includes a request to insert potential content into the web page indicated as requested by the request 112*a*. This request 112*b* can include the above contextual information. In addition, this request 112*b* may, but need not, indicate the potential content. For instance, the web server 120 may determine the potential content to insert into the requested web page and augments the subsequent request 112*b* with at least an indication of the potential content. In response to generating the subsequent request 112*b*, the web server 120 transmits the subsequent request 112*b* to the computer system 130.

The computer system 130 includes server cluster, server farm, other arrangements of servers or computing devices, or the like capable of determining whether to block the potential content (if the content is not indicated in the request 112*b*, the computer system 130 can maintain a set of content and can determine, from the set, which content needs to be blocked and which content can be shown). The computer system 130 receives and ingests the subsequent request 112*b* from the web server 120 and executes a content insertion model 132. In some examples, the content insertion model 132 includes can approximate the request 112*b* by matching it to a set of cohorts and can use properties of the matched cohort(s) to determine whether the potential content can be inserted in the web page or not. Examples of the content insertion model 132 are further described herein below.

The computer system 130 can include one or more software programs in addition to the content insertion model 132. For example, and as illustrated, the computer system 130 includes content identifiers 133 and a cohort graph 134, though any other software programs can be included additionally or alternatively to those illustrated in FIG. 1. The content identifiers 133 may identify, or may be used to identify, the potential content if not included in the request 112*b*. For example, the computer system 130 executes the content identifiers 133 to identify a list of potential content based on some or all of the contextual information (e.g., based on the type of web page). This list can be processed to determine whether particular content is to be blocked and to identify at least one particular content that can be inserted in the web page. The cohort graph 134 may be generated by the content insertion model 132 and may be included as a component of the content insertion model 132. The cohort graph 134 includes one or more graphs, such as lattices or lattice-like structures, that relate different cohorts. In some examples, the content insertion model 132 uses the cohort graph 134 to determine the approximate the request 112*b* and/or to determine whether to block the potential content. The cohort graph 134 may be generated based on previous requests for different web pages and based on previous insertion of different content in such web pages. The content insertion model 132 may track, for each content, properties that are associated with each cohort, such as the number of times the content has been inserted over a period of time in association with the and/or whether its future insertion should be blocked.

The computer system 130, using any suitable combination of the content insertion model 132, the content identifiers 133, and the cohort graph 134, determines whether to block the potential content from being inserted into the requested web page. Additionally or alternatively, the computer system 130 determines and/or stores metadata 142 in a data store 140 communicatively coupled to the computer system 130. In some examples, the data store 140 is included in the computer system 130. The metadata 142 can include the contextual information received by the computer system 130, contextual information determined by the computer system 130, the decision of whether to block the potential content, and the like. The computer system 130 generates a response 114 indicating whether the potential content is to be inserted or not in the web page, and transmits the response 114 to the web server 120. In some examples, the response 114 includes data that indicates insertion or no insertion or, possibly, instructions executable by the web server 120 to cause the web server 120 to insert the potential content into the requested web page (e.g., in instances in which the computer system 130 determines to not block the potential content) or to not insert the potential content into the requested web page (e.g., in instances in which the computer system 130 determines to block the potential content). In examples in which the response 114 causes the web server 120 to not insert the potential content into the requested web page, the web server 120 iteratively processes different potential content and transmits subsequen t request(s) **112*b* to the computer system 130 until the response 114 causes the web server 120 to insert the potential content into the requested web page. Alternatively, no subsequent request(s) 112*b* are needed. Instead, the iterative processing is triggered by the computer system 130**.

Based on the indication to insert potential content into the requested web page, the web server 120 inserts this content in a web page 116 (e.g., by inserting a universal resource locator (URL) of the content in code of the web page 116) and sends the web page 116 to the user device 110, which receives and displays the web page 116.

Figure 2:
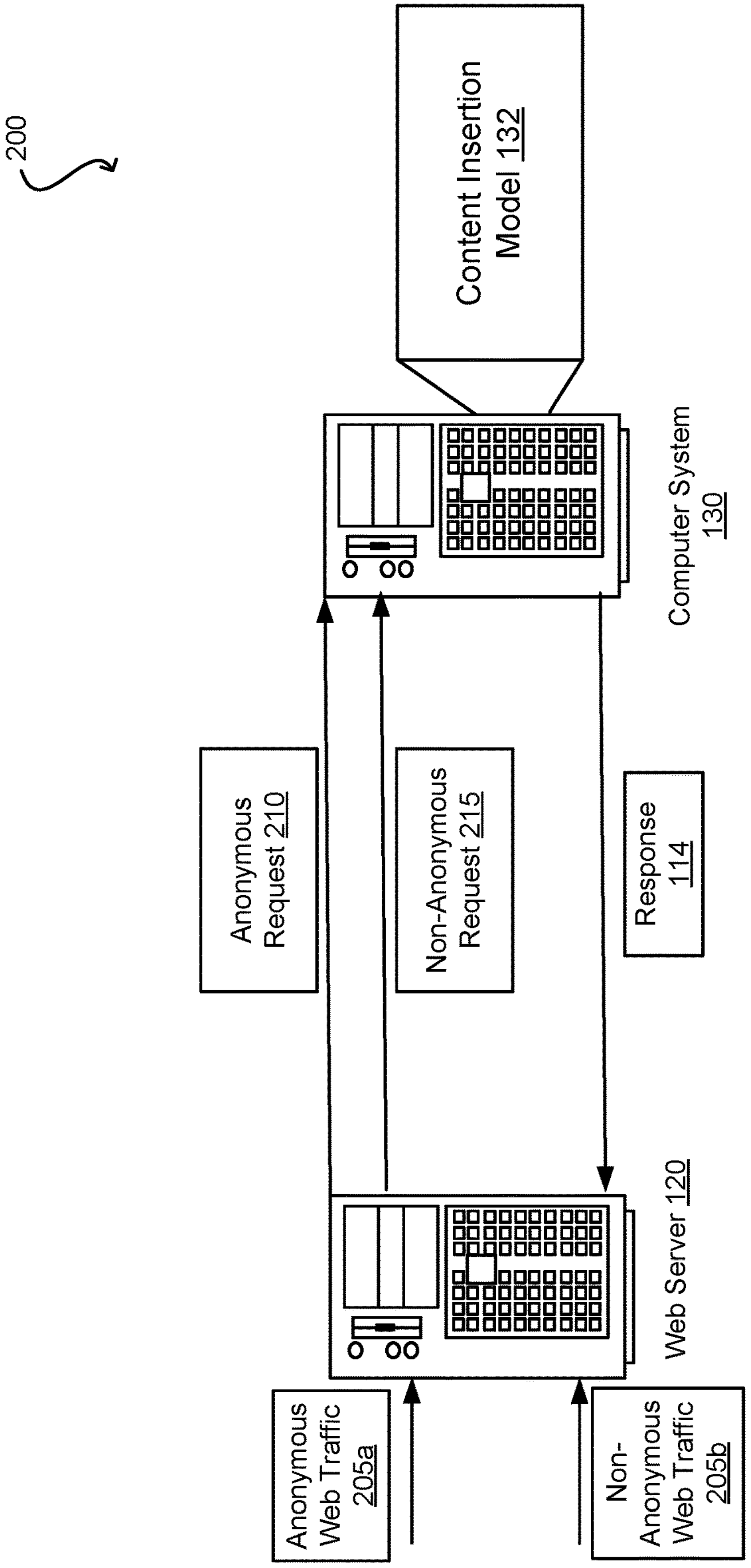
FIG. 2 illustrates an example of a network environment for processing anonymous and non-anonymous web traffic, according to an embodiment of the present disclosure.

FIG. 2 illustrates an example of a network environment 200 for processing anonymous and non-anonymous web traffic, according to an embodiment of the present disclosure. As illustrated, the network environment 200 includes the web server 120 and the computer system 130, though any other components can be included in the network environment 200 for processing anonymous and non-anonymous requests for content insertion. The web server 120 is communicatively coupled with the computer system 130.

The web server 120 can receive a request (e.g., the request **112*a* described with respect to the network environment 100) from a user device to access a web page. The request can correspond to anonymous web traffic 205*a* or to non-anonymous web traffic 205*b*. The anonymous web traffic 205*a* may be associated be contextual information that does not include identifying information about the user. For example, the anonymous web traffic 205*a* does not include a suitable user ID corresponding to the user. The non-anonymous web traffic 205*b* be associated with contextual information that includes, among other things, a suitable user ID. The web server 120, as applicable, ingests the anonymous web traffic 205*a* or the non-anonymous web traffic 205*b* in the same manner and generates an anonymous request 210 or a non-anonymous request 215**, respectively. Both types of requests may include the corresponding contextual information.

The computer system 130 ingests and processes the anonymous request 210 or the non-anonymous request 215, as the case may be, in the same manner. For example, both types of requests are processed by the same content insertion model 132. As such, regardless of whether the computer system 130 receives the anonymous request 210 or the non-anonymous request 215, the computer system 130 executes the content insertion model 132 to determine whether to block potential content or not from being inserted in a web page provided by the web server 120. In examples in which the received request is the non-anonymous request 215, this request 215 can be matched typically to a cohort that has the user ID as an attribute value. In examples in which the received request is the anonymous request 210, this request 210 can be matched to a set of cohorts, none of which has the user ID as an attribute value. Properties of the matched cohort(s) specific to potential content are then processed to determine if this content can be inserted or is to be blocked.

In response to determining whether to block the potential content, the computer system 130 generates the response 114 to the web server 120. The type of information in the response 114 can be the same regardless of whether the anonymous request 210 or the non-anonymous request 215 are processed. In particular, this response 114 informs the web server 120 whether the potential content is be inserted or is to be blocked or can identify an insertable content.

Figure 3:
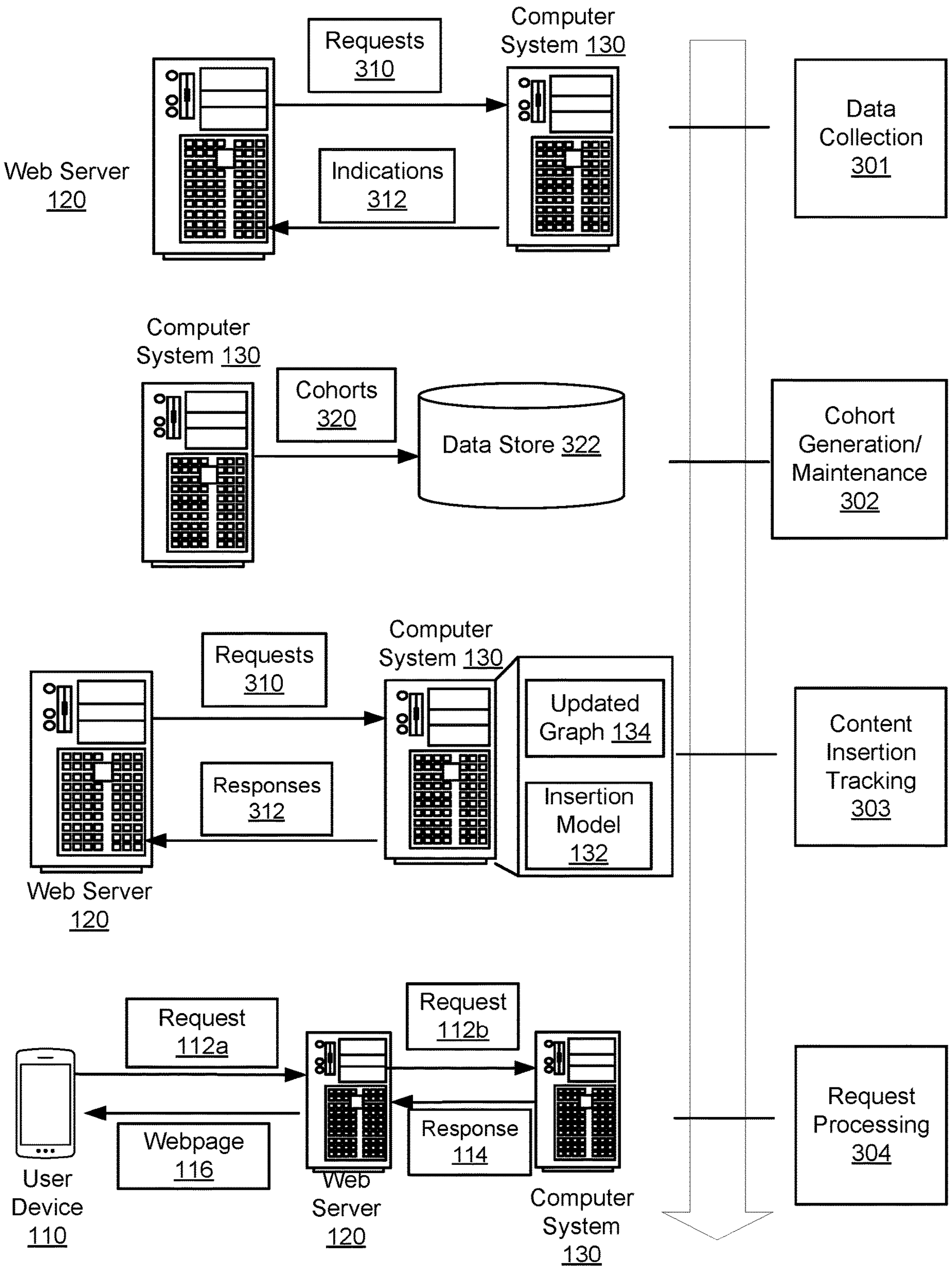
FIG. 3 illustrates an example block diagram of stages for processing anonymous and non-anonymous web traffic, according to an embodiment of the present disclosure.

FIG. 3 illustrates an example block diagram of stages for processing anonymous and non-anonymous web traffic, according to an embodiment of the present disclosure. The stages include a data collection stage 301, a cohort generation/maintenance stage 302, a content insertion tracking stage 303, and a request processing stage 304, though any other suitable stage can be included for processing anonymous and non-anonymous requests for content insertion.

At the data collection stage 301, the web server 120 (and any additional web servers) transmits requests 310 to the computer system 130, which processes the requests 310, generates responses 312, and transmits the responses 312 to the web server 120. The requests 310 are for content insertion into web pages of one or more web sites hosted by the web server 120, and the responses 312 indicate whether to insert or different content into the requested web pages. The computer system 130, or any other suitable computing device, collects data relating to the requests 310 and the responses 312. For example, the computer system 130 collects contextual associated with the requests 310 and insert (unblock) and block decisions included in the responses 312. Such collected data can be stored in a data store 322.

At the cohort generation/maintenance stage 302, the computer system 130 generates and maintains cohorts 320. The stage 302 can be repeated periodically, for example hourly, daily, weekly, monthly, etc. The computer system 130 uses the collected data to generate cohorts 320 and/or update existing cohorts. In some examples, the computer system 130 at the stage 302 generates a graph structure that represents the cohorts 320. In some examples, the graph structure includes a lattice that relates the cohorts 320. Each cohort represents a subset of the requests 310 that share a same set of attribute values determined from the contextual information. The computer system 130 stores the generated or updated cohorts 320 in the data store 322 that can be accessed by the computer system 130 for future processing of a request and a future decision about whether to block potential content from being inserted into a requested web page.

At the content insertion tracking stage 303, the computer system 130 tracks properties associated with each cohort and with each potential content. The properties can include any or a combination of the count of content insertions and decisions to block or insert the potential content. Additionally, the computer system 130 updates the cohort graph 134 to track the counts and the decisions. Although this stage 303 is shown as occurring before the request processing stage 304, it can occur in parallel and/or subsequently thereto.

At the request processing stage 304, the user device 110 transmits the request 112*a* to the web server 120, and, in turn, the web server 120 generates and transmits the subsequent request 112*b* to the computer system 130. The computer system 130 executes the content insertion model 132 to determine, using the original cohort graph or the updated graph 134 (as the case may be) and the properties associated with the cohorts, whether to block the potential content from being inserted into the requested web page. Based on the determination, the computer system 130 generates and transmits an response 114 to the web server 120 for use with the content insertion in the requested web page. Accordingly, the web server 120 generates and transmits the web page 116 to the user device 110.

Figure 4:
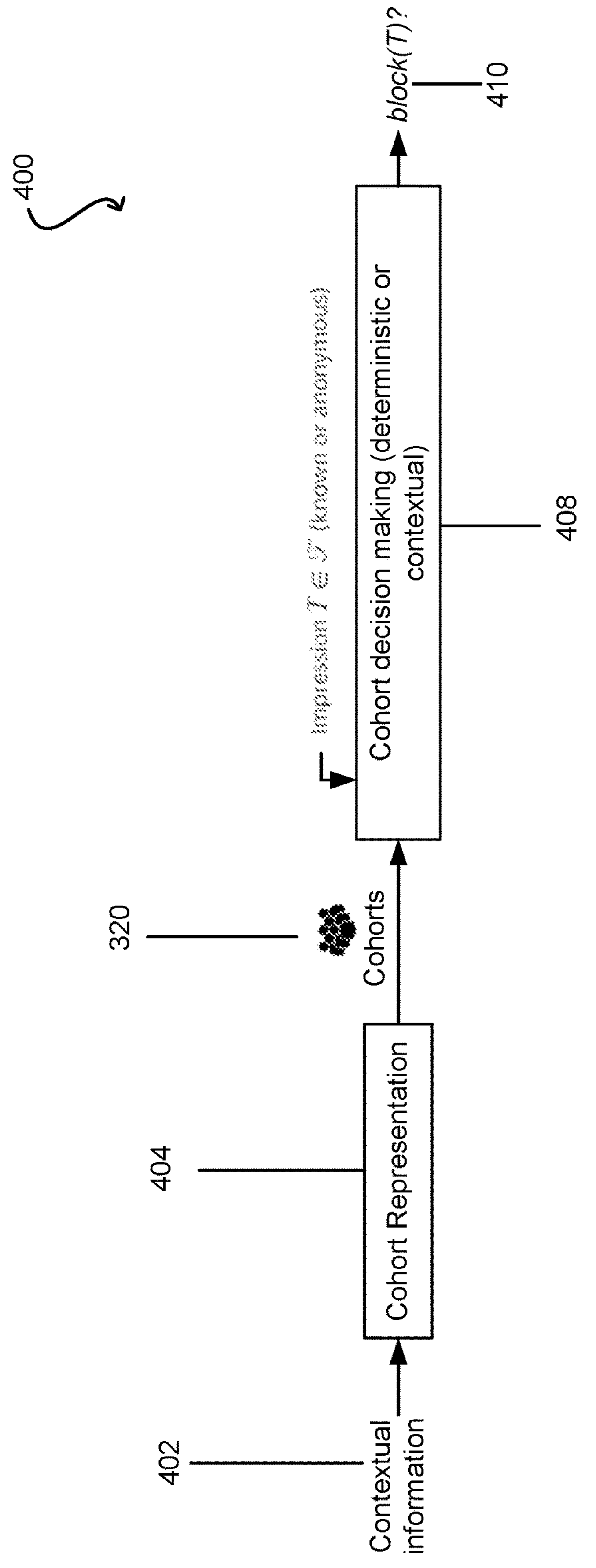
FIG. 4 illustrates an example of a diagram for cohort-based processing, according to an embodiment of the present disclosure.

FIG. 4 illustrates an example of a diagram 400 for cohort-based processing, according to an embodiment of the present disclosure. In some examples, the diagram 400 involves two stages: a cohort representation 404 stage, whereby cohorts are generated, and a cohort decision making stage 408, whereby the cohorts are used to make a decision about blocking or unblocking the insertion of content in response to a content insertion request. The first stage can be triggered with contextual information 402. The contextual information 402 can be collected over time based on previous content insertion requests. The contextual information 402 includes attribute values, such as geographic locations, network locations, times of the requests, types of the requests, sizes of content slots (e.g., web space dimensions), and the like, that are non-user identifying information. In some examples, the contextual information 402 may additionally include user identifying information.

The contextual information 402 is used to determine a cohort representation 404. The cohort representation 404 may involve one or more steps or techniques to generate new cohorts and/or update existing cohorts using the contextual information 402. Generally, each request is associated with contextual information that includes values for attributes. A cohort can be defined to represent a set of requests that share the same attribute values. One way to generate the cohorts is to process the collected data and use a lattice-like structure. A bottom node represents a cohort that has all the attribute values (which is typically blank). A top node represents a cohort that has none of the attribute values. In between, at different hierarchical levels, parent-child nodes are used, where a node represents a cohort having a particular combination of attribute values, a child node has all the attribute values of the parent node and additional attributes (e.g., those of another parent node), and the like. Pruning can be used to remove absurd nodes and all child nodes that descend from an absurd node. Absurdity of a node can be determined by counting how may requests share the attribute values of that node. If that count is below a threshold value, the node is declared to be absurd.

Different algorithms are possible to generate a cohort space. In one example, a Frequent Pattern Mining algorithm is used, such as an Apriori algorithm is used. The Apriori algorithm builds the cohort space in the form of a lattice with parent-child relations between the cohorts. The root of the lattice is a cohort represented with no attribute whose members are all the impressions, and the lowest level of the lattice contains an absurd cohort with all attribute values. The "anti-monotonic" property is exploited by the Apriori algorithm for an efficient materialization of valid cohorts. In a top-down generation of the lattice, the anti-monotonicity implies that in case a cohort "C" is absurd, all the subsequent cohorts in the sub-lattice rooted at this cohort are also absurd. This enables an "early stopping" criteria where the lattice expands only for valid cohorts.

In some examples, a request is represented by an impression T. A cohort is represented using the contextual attributes of its impressions. For a given impression $T=\langle u_T, ct_T, t_T\rangle$, $attribs(T)=\{\langle a, v\rangle\}$ are defined as T's attributes, where $attribs(T)=attribs(u_T)\cup attribs(ct_T)$. Two types of impression attributes can be distinguished: identification attributes and contextual attributes. Identification attributes identify impressions as a unique entity, and contextual attributes group entities. If there exists an identification attribute $a_{id}\in A$ (e.g., user ID, device ID, browser ID) where $\langle a_{id}, v\rangle\in attribs(T)$, then the set of attributes can be reduced to $a_{id}$ (e.g., $attribs(T)=\{\langle a_{id}, v\rangle\}$. The reason is that users are fully known with the identification attributes and managing frequency of content insertion with a fully known user may not use further attributes to recognize and serve users.

A set of cohorts can be defined as $C=\{C_1, C_2, \ldots\}$ where each cohort $C_i\in C$ is characterized with a set of impressions $imp(C_i)$ and common attributes $attribs(C_i)$, where $\forall T\in imp(C_i)$, $attribs(C_i)\subseteq attribs(T)$. $attribs(C_i)$ may include or be the representation of the cohort $C_i$. The size of the cohort space can be very large. For example, given n contextual attribute values, $|C|=2n$. C can be divided into two subsets: valid cohorts $C_{valid}$ and absurd cohorts $C_{absurd}$, where $C_{valid}\cup C_{absurd}=C$. Given a cohort $C_i$, $C_i\in C_{absurd}$ if and only if $\exists\langle a, v\rangle\langle a', v'\rangle\in attribs(C_i)$ s.t., $a=a'\wedge v\neq v'$. The cohort representation 404 may not consider absurd values. For example, the cohort representation 404 may remove or prune absurd attributes from consideration when associating cohorts, etc.

The cohort space, which includes the cohorts 320, can be generated using the Apriori algorithm, or other suitable techniques relating to frequent pattern mining. The algorithm builds C in the form of a lattice with parent-child relations between the cohorts 320. The root of the lattice is a cohort represented with no attribute whose members are the impressions, and the lowest level of the lattice includes an absurd cohort with all attribute values. The "anti-monotonic" property is exploited by the algorithm for an efficient materialization of valid cohorts. In a top-down generation of the lattice, the anti-monotonicity implies that in case a cohort $C_j$ is absurd, all the subsequent cohorts in the sub-lattice rooted at $C_j$ are also absurd. This enables an "early stopping" criteria where the lattice expands only for valid cohorts.

Once the cohorts 320 are generated, the second stage can be triggered upon receiving a request for content insertion (illustrated in FIG. 4 as an impression T, where the underlying web traffic can be anonymous or non-anonymous (e.g., known by having a user ID). The cohort decision making 408 can involve using the cohorts 320 to make decisions relating to whether to insert content into a requested web page. Generally, the request has its own contextual information that includes attribute values. These attribute values are matched to attribute values of one or more cohorts. An exact match may not be needed. Instead, a probabilistic match can be implemented (e.g., such as one implementing a Jaccard function).

Assuming that the request is matched to a single cohort, the properties of the cohort can be used to determine whether to block or unblock the insertion of content in a response to the request. The properties can track how many times the content was inserted over a period of time in association with the cohort. If this number of times exceeds a threshold, the decision can be to block. Rather than tracking the number of times (e.g., by using a machine learning model as further described herein below), or in addition to tracking the number of times, the properties can also include a block/unblock flag. In both cases, a decision is made to block or unblock based on these properties.

Assuming that the request is matched to more than one cohort, the properties of each of the matched cohorts are determined. Different techniques are then available to generate a decision based on the determined properties. In one example, a least misery technique is used, whereby if any one the matched cohorts has properties indicating that the content is to be blocked, the decision is to block. In another example, a block ratio is used. This ratio can be the number of matched cohorts having properties indicating that the content is to be blocked over the total number of matched cohorts. The block ratio can be compared to a threshold (e.g., which can be set to 0.5, for instance, for a majority voting implementation). If it is equal to or greater than the threshold, the decision is to block.

Referring back to impressions of the first stage, next is a particular example of the second stage. To handle content frequency management for anonymous web traffic, a mechanism can be used to place anonymous impressions into the cohorts. Given the obscurity of anonymous traffic, the cohort membership can be defined in a probabilistic manner. Given an impression request $T_i \in T$ and a cohort $C_j \in C_{valid}$, $T_i$ is a member of $C_j$ with a member degree $\delta(T_i, C_j) \rightarrow [0,1]$, which is determined by:

$$\delta(T_i, C_j) = \text{Jaccard}(attribs(T_i), attribs(C_j)) \tag{1}$$

Thus, the following cases may occur: (i) in the case of $\delta(T_i, C_j)=0$, $T_i$ is definitely not a member of $C_j$, (ii) in the case of $\delta(T_i, C_j) \in (0,1)$, $T_i$ is a partial member of $C_j$, and the value of $\delta$ implies the strength of the membership, and (iii) in the case of $\delta(T_i, C_j)=1$, $T_i$ is definitely a member of $C_j$. The impression count of a cohort $C_i$ for a particular content item $ct_i$ up to a time $t_i$ can be determined by:

$$imp_{count(C_i, ct_i, t_i)} = \sum_T 1X\delta(T, C_i), \tag{2}$$
$$\text{s.t., } T = \langle \text{none}, ct_T, t_T \rangle \in imp(C_i) \wedge ct_T = ct_i \wedge t_T \le t_i$$

Once the anonymous web traffic is joined with (e.g., matched to) the cohorts using Equation 1, frequency capping decisions can be made using at least two different strategies. For example, the strategies can include deterministic and contextual. Regarding deterministic, each cohort is assumed to be a "virtual user" and follow a user-centric frequency capping mechanism for the cohorts. Regarding the contextual, mapping the context of the cohorts to the frequency capping decision is learned by predicting the capping situation based on the contextual attributes of the cohort.

To decide whether to insert an incoming content impression $T=\langle \text{none}, ct_T, t_T \rangle$, cohort-level decisions can be aggregated from the cohorts which host T. The set of cohorts can be defined as: cohorts(T)=$\{C_i \in C | \delta(T, C_i) \rightarrow \max\}$. Cohorts involved may include those whose $\delta(T, C_i)$ is at a maximum. This ensures that the cohort decisions are deterministic. Each cohort $C_i \in$ cohorts(T) may block or allow $ct_T$ at time $t_T$. Blocking content insertion, or block($C_i$, $ct_T$, $t_T$)=true, occurs in response to the following conditions:

$$imp_{count(C_i, ct_T, t_T)} > (\rho X \max\_\text{cap}(ct_T)) \tag{3}$$

In Equation 3, $\rho$ is a discount factor for the potential content's maximum cap. The discount factor can be calculated as $\rho = |attribs(C_i)|/|A|$. The maximum cap discount factor may imply that the less attributes in the cohort representation, the more discount the frequency cap receives. In an extreme case in which the representation of the cohort $C_i$ includes all the attributes in A, the discount factor is 1. To decide about blocking an impression T using cohorts(T), we define a function $block_{ratio(T)} \rightarrow [0,1]$ as follows:

$$\text{block\_ratio}(T) = \frac{|C_i \in \text{cohorts}(T), \text{block}(C_i, ct_T, t_T) = \text{true}|}{|\text{cohorts}(T)|} \tag{4}$$

The function block_ratio(T) is the summary of cohort-level decisions about T. The frequency capping decision can be made using any suitable aggregation function such as majority voting, least misery, or the like. In some examples, a decision 410 to block the potential content, block(T)=true, may occur under the following condition: block_ratio(T)$\ge\mu$, where $\mu \in [0,1]$ is a majority threshold set by default to 0.5. Thus, if half of the cohorts in cohorts(T) block the potential content, then the potential content is blocked and prevented from being served with respect to the anonymous web traffic. In some examples, larger values of $\mu$ decrease the chance of serving the potential content, and vice versa.

In the contextual strategy, a machine learning (ML) model is used. The cohorts can be divided (not equally necessarily) in two sets. The number of impressions count over a period of time is tracked for each cohort of the first set. For a cohort of the first set, this number, along with attributes values of contextual information associated with the cohort, are used to generate a training input. In particular, this number, when exceeding a threshold, indicates a block decision and, otherwise, an unblock decision. Accordingly, a ground truth label can be generated for this number can be the block/unblock decision. The attribute values are input to the ML model that then generates a decision to block or unblock. This decision can be compared to the ground truth label and a reward or penalty function can be defined based on the prediction and the ground truth label. This training can span all the cohorts of the first set and can be iterative until the prediction performance of the ML model reaches a threshold performance value (e.g., 95% accuracy).

Thereafter, the ML model is used to predict the block/unblock decision for each cohort of the second set. Here, the impression count for each cohort is not needed. Instead, for a cohort of the second set, attributes values of contextual information associated with the cohort are used to generate an input to the ML model. In response to this input, the ML generates an output indicating the decision to block or unblock for the cohort.

In an example of this ML-based contextual modeling, the unknown behavior of anonymous web traffic may be predicted based on the known traffic. Given an incoming anonymous impression $T=\langle \text{none}, ct_T, t_T \rangle$ joining a cohort $C_i$, a probability prediction function is defined as $g(T, C_i)\rightarrow[0,1]$ and a cut-off threshold is defined as $\lambda\in[0,1]$ where the expression $g(T, C_i)>\lambda\rightarrow$true approximates block $(T)\rightarrow$true. To build $g(\bullet)$, contextual information is leveraged. $g(\bullet)$ is defined as a function of the following predictor features $P(T, C_i)$, which can be obtained through an exhaustive feature selection process. Note that the order is arbitrary:

Impressions within cohort. $P_1(T, C_i)$ is the cohort impression count imp_count($C_i$);

Maximum cap. $P_2(T, C_i)$ is max_cap($ct_T$);

Cap period. $P_3(T, C_i)$ is period($ct_T$);

Cap ratio. $P_4(T, C_i)$ is the cap ratio cap_ratio($ct_T$)=$P_2(T, C_i)/P_1(T, C_i)$;

Day of week. $P_5(T, C_i)$ is the function dayweek($t_T$)$\rightarrow[0, 6]$;

Hour of day. $P_6(T, C_i)$ is the function hour($t_T$)$\rightarrow[0,23]$.

Accordingly, the function $g(P_{[1,6]}(T, C_i))$ can predict whether the potential content should be blocked. To build $g(\bullet)$, a binary classifier can be trained with the features $P_{[1,6]}(T, C_i)$ and a binary label overage $(T, C_i)$, which is defined as:

$$\text{overage}(T, C_i) = \begin{cases} \text{true if } imp_{count(C_i, ct_T, t_T)} > \text{max\_cap}(ct_T) \\ \text{false otherwise} \end{cases} \tag{5}$$

The true value of the binary label overage indicates that there exists the risk of over-exposing the users in the cohort to the potential content, which can result in user fatigue or otherwise may reduce the efficacy of the potential content.

Figure 5:
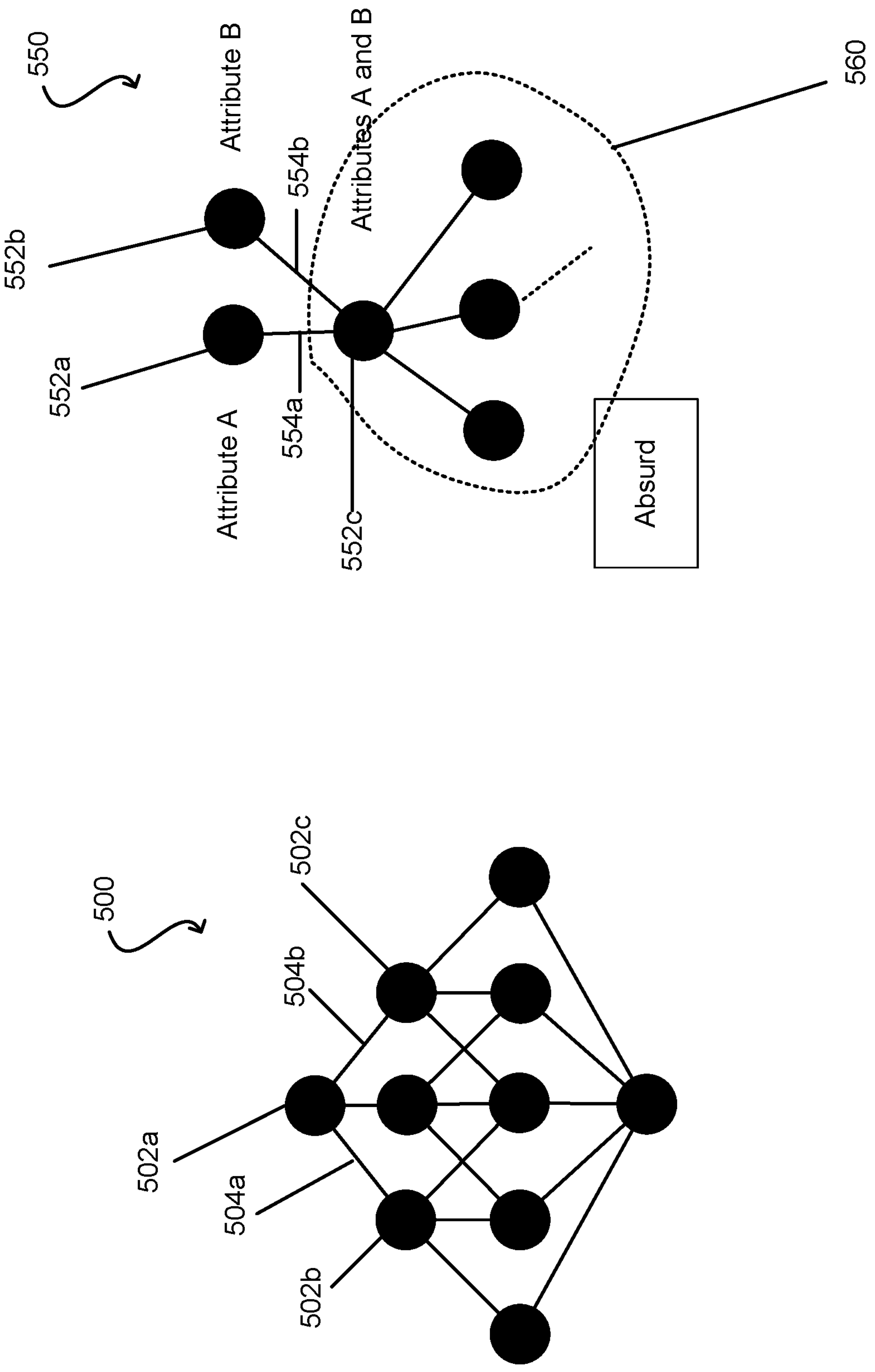
FIG. 5 illustrates an example of a graph-based modeling of cohorts, according to an embodiment of the present disclosure.

FIG. 5 illustrates an example of a graph-based modeling of cohorts, according to an embodiment of the present disclosure. In the illustration of FIG. 5, a lattice 500 is used as a structure of the graph. In some examples, the lattice 500 may be generated by techniques described with respect to the cohort representation 404 (e.g., using an Apriori algorithm and pruning nodes based on an absurdity approach). In other examples, the lattice 500 is generated by a graph neural network (GNN) trained using historic contextual information.

As illustrated, the lattice 500 includes the nodes 502*a-c* (e.g., each representing a different cohort) and the connections 504*a-b*, though any other suitable number and/or arrangement of nodes and connections is possible for the lattice 500. The node 502*a* may be a root node from which each remaining node of the lattice 500 may at least indirectly may propagate. The node 502*a* is connected to the node 502*b* via the connection 504*a*, and the node 502*a* is connected to the node 502*c* via the connection 504*b*. Thus, the node 502*a* may have similar attribute values to both the node 502*b* and the node 502*c*. In a particular example, the node 502*a* may include an attribute of being located in San Francisco, which may be shared with the nodes 502*b-c*. Additionally, the nodes 502*b-c* may include attribute values not in common with the node 502*a* or with each other. For example, the node 502*b* may include an attribute of typically sends a request between 7:00 AM-10:00 AM, whereas the node 502*c* may include an attribute of typically sending a request between 4:00 PM-6:00 PM. In some examples, the node 502*a* may be missing an attribute value similar to those of the nodes 502*b-c*.

The lattice 550 can be pruned to facilitate a more efficient determination of whether to block potential content from being inserted into a requested web page. For example, the lattice 550 is traversed to determine which, if any, of the nodes are absurd. An absurd node is a node that cannot logically exist. The absurd nodes are pruned along with any nodes that propagate either directly or indirectly from the pruned absurd nodes. In a particular example, the lattice 550 includes nodes 552*a-c* and connections 554*a-b*. The node 552*a* includes an attribute of a first operating system, the node 552*b* includes an attribute of a second operating system, and the node 552*c* includes attributes of both operating system. The nodes 552*a-b* are connected to the node 552*c* by the connection 554*a* and the connection 554*b*, respectively. While the nodes 552*a-b* are individually not absurd, the node 552*c* is absurd due to the combination of contradictory attributes. Thus, the node 552*c* is removed from the lattice 550. Additionally, the group of nodes 560 can be pruned since each node included in the group of nodes 560 propagates from the node 552*c*, which is the root node of the group of nodes 560.

Figure 6:
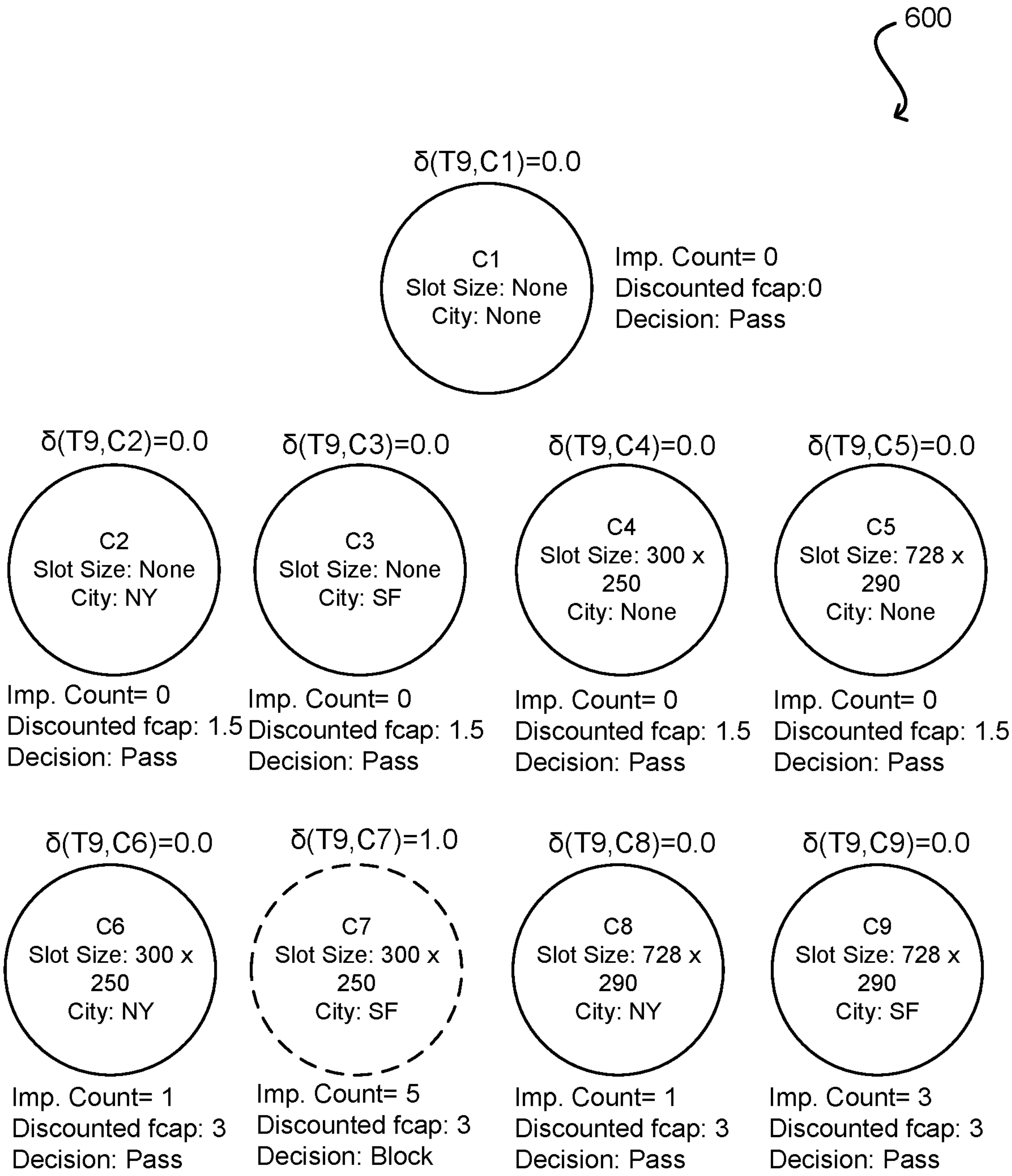
FIG. 6 illustrates examples of cohorts, according to an embodiment of the present disclosure.

Different technique are possible to determine absurdity. One technique relates to analyzing the attribute values. If a node is determined to include two conflicting attribute values, the node is determined to be absurd. In another technique, the number of requests that a node (or the underlying cohort) represents is analyzed. If this number is determined to be smaller than a threshold value, the node is determined to be absurd FIG. 6 illustrates examples of cohorts 320, according to an embodiment of the present disclosure. As illustrated, the cohorts 320 include nine different cohorts labeled C1-C9 and that are arranged in descending order of generality from top to bottom, though any other number or arrangement of cohorts is possible for the cohorts 320.

The cohorts 320 are characterized by various attributes. As illustrated, the attributes of the cohorts include a geographic location and a slot size, though any other suitable combination of attributes can be used for the cohorts 320. As an example, cohort C1 does not include a defined attribute for geographic location or slot size, cohorts C2-C5 include defined attributes for one of the attributes, and cohorts C6-C9 include defined attributes for both of the attributes. Based on the cohorts C1-C9 and the attributes thereof, the content insertion model 132 determines whether to block the potential content T9.

The content insertion model 132 uses least misery techniques, majority vote techniques, or any other suitable techniques for determining whether to block the potential content in response to a request (the request is shown as T9). This request is matched with a set of the cohorts C1-C9. In the illustration of FIG. 6, it is matched to one cohort: C7 (as indicated with the dashed circle, and with the Jaccard similarity score of 1.0).

In examples in which the content insertion model 132 uses least misery techniques, because C7 is associated with a decision to block, the content cannot be inserted (regardless of properties of any other blocks if a match thereto existed). In examples in which the content insertion model 132 uses majority vote techniques to determine whether to block the potential content T9, a block ratio is computed. Here, the block ratio is "1" because T9 is matched to C7 only and because C7 has a block decision. When compared to a 0.5 threshold, the decision would be to block the insertion.

Figure 7:
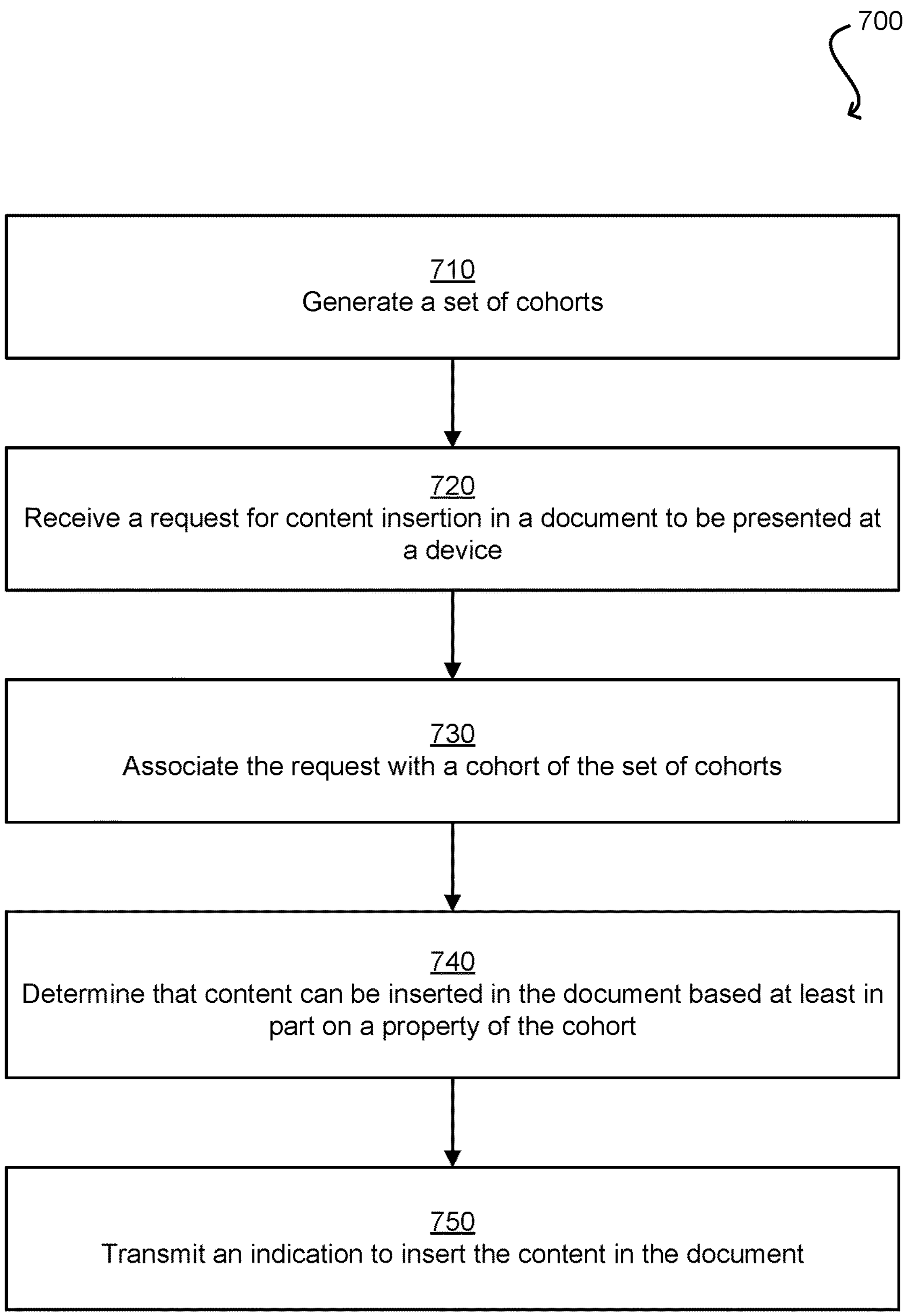
FIG. 7 illustrates an example flow of a process for processing web traffic, according to an embodiment of the present disclosure.

FIG. 7 illustrates an example flow of a process 700 for processing web traffic, according to an embodiment of the present disclosure. Some or all of the processes (or any other processes described herein, or variations, and/or combinations thereof) may be performed under the control of one or more computer systems, such as the computer system 130 in FIG. 1, configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

In an example, the flow includes operation 710, where the computer system 130 generates a set of cohorts. The set of cohorts can be generated by the computer system 130 based on contextual information. For example, the computer system 130 collects historical request data and/or historical content insertion data for various anonymous web traffic and can determine and collect contextual information for the cohorts. In some examples, the computer system 130 generates a graph that relates the cohorts to one another.

In an example, the flow includes operation 720, where the computer system 130 receives a request for content insertion in a document to be presented at a device. The document may include a web page, the device may include the user device 110, etc. The computer system 130 receives the request from the web server 120 or other suitable online service. The request may correspond to anonymous traffic.

In an example, the flow includes operation 730, where the computer system 130 associates the request with a cohort of the set of generated cohorts. The request includes attributes and/or contextual information that the computer system 130 can determine based on receiving the request. In some examples, the computer system 130 associates the request with the cohort based on attributes of the cohort and/or the contextual information of the request. The contextual information may match or otherwise correspond to one or more attributes of the cohort, or the like. A similarity function, such as a Jaccard function, can be used to match the request with a set of cohorts, based on the attributes values of the request and the attribute values of each of such cohorts.

In an example, the flow includes operation 740, where the computer system 130 determines that the content can be inserted into the document based at least in part on a content property of the cohort. The content property may include any or a combination of insertion count over a period of time or a block/unblock flag. Based on the content property, the computer system 130 determines whether to block the content from being inserted into the document.

In an example, the flow includes operation 750, where the computer system 130 transmits an indication to insert the content into the document. The indication may include instructions executable by the web server 120 or other suitable computing entity for causing the content to be inserted into the document. The computer system 130 determines that the content property of the cohort should not prevent the content from being inserted into the document. Once the content is inserted into the document, the document may be transmitted to the device for providing the document and the inserted content to the user of the device.

FIG. 8 illustrates an example flow of a process 800 for generating cohorts, according to an embodiment of the present disclosure. Some or all of the processes (or any other processes described herein, or variations, and/or combinations thereof) may be performed under the control of one or more computer systems, such as the computer system 130 in FIG. 1, configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

In an example, the flow includes operation 810, where the computer system 130 receives historical content insertion requests. The computer system 130 may have previously processed the historical content insertion requests and/or may access the historical content insertion requests from a data repository such as the data store 140. The historical content insertion requests may have been made by the web server 120 or other suitable computing entity such as a social media digital platform, etc.

In an example, the flow includes operation 820, where the computer system 130 determines attribute values for each historical content insertion request based on contextual information of the historical content insertion requests.

In an example, the flow includes operation 830, where the computer system 130 represents sets of attribute values with nodes in a graph. The computer system 130 may execute an Apriori algorithm or a GNN to generate the graph, which may include the nodes and connections that connect the nodes.

In an example, the flow includes operation 840, where the computer system 130 determines an absurdity of a node. Whether a node is absurd depends on one or more attribute values of the node and/or the number of the historical content insertion requests represented by the cohort that corresponds to the node.

In an example, the flow includes operation 850, where the computer system 130 removes the node and any child nodes therefrom from the graph. The node may have been identified by the computer system 130 as absurd. The computer system 130 prunes the node from the graph. Pruning a node involves removing (i) the node from the graph and (ii) removing any descendant nodes therefrom (e.g., its child nodes and the descendants of each of such child nodes).

In an example, the flow includes operation 860, where the computer system 130 stores the graph, where each node corresponds to a cohort. The graph is stored in a graph depository (e.g., the data store 140 or other suitable location) that can be accessed for a content insertion decision making.

Figure 9:
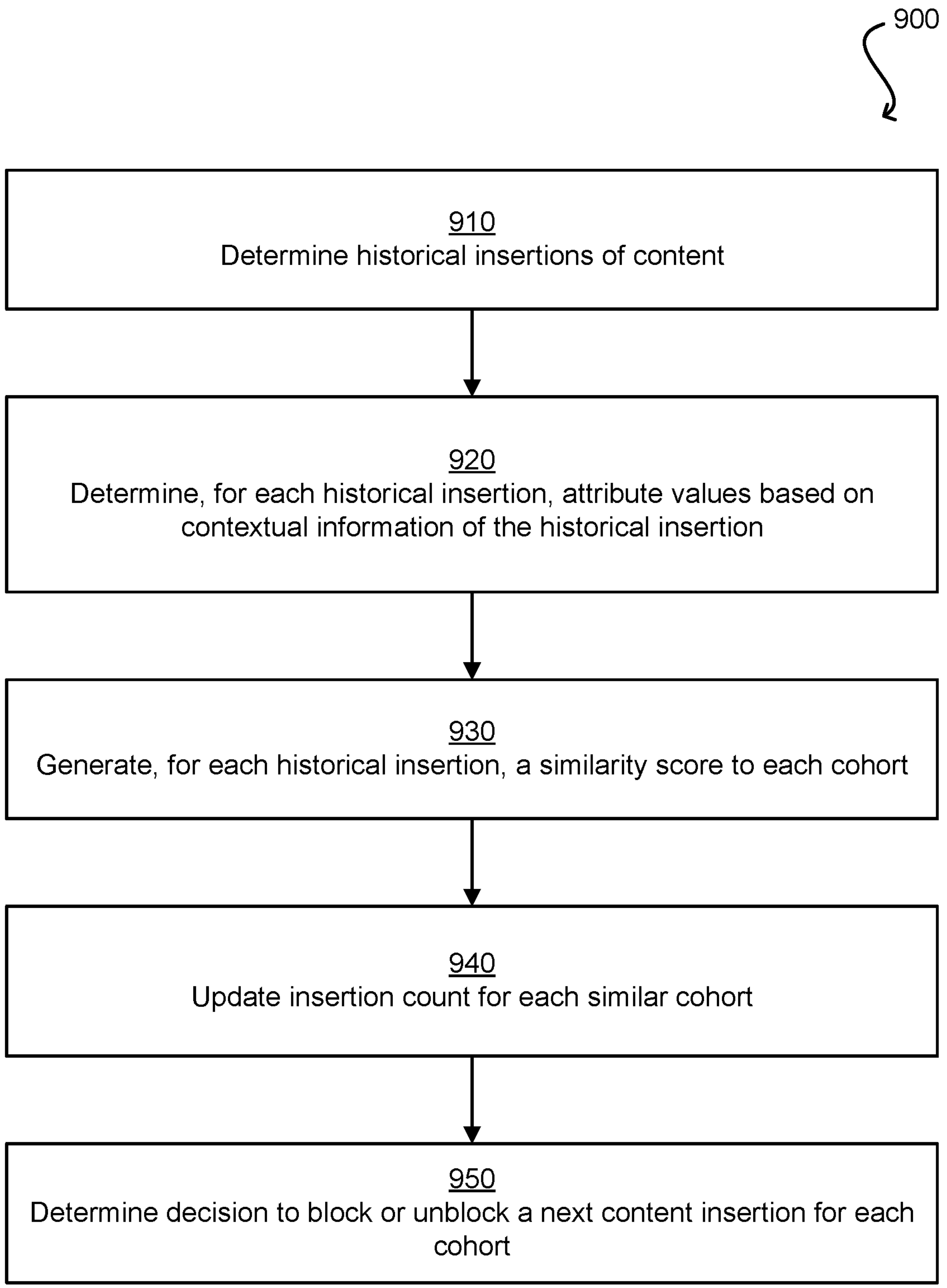
FIG. 9 illustrates an example flow of a process for cohort properties, according to an embodiment of the present disclosure.

FIG. 9 illustrates an example flow of a process 900 for maintaining cohort properties, according to an embodiment of the present disclosure. Some or all of the processes (or any other processes described herein, or variations, and/or combinations thereof) may be performed under the control of one or more computer systems, such as the computer system 130 in FIG. 1, configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

In an example, the flow includes operation 910, where the computer system 130 determines historical insertions of content. The historical insertions of content can each be inserted into a document (e.g., a requested web page) in response to different historical content insertion requests. The computer system 130 can identify the historical requests for which the requested content was inserted into the document. In some examples, the computer system 130 determines a count for each historical insertion (e.g., the computer system 130 keeps track of a count of how many times a particular content item is inserted, etc.).

In an example, the flow includes operation 920, where the computer system 130 determines, for each historical content insertion, attribute values based on contextual information of the corresponding historical insertion request.

In an example, the flow includes operation 930, where the computer system 130 generates, for each historical insertion, a similarity score to each cohort. The computer system 130 accesses a graph or lattice-like structure, which may be stored in a depository (e.g., the data store 140) accessible by the computer system 130. The computer system 130 compares each historical insertion to each cohort (e.g., by comparing their attribute values using a similarity model, such as a Jaccard model) to determine similarity scores between each historical insertion and each cohort. A cohort is determined to be similar (and is declared as a similar cohort) if the corresponding similarity score is over a threshold value.

In an example, the flow includes operation 940, where the computer system 130 updates the insertion count for each similar cohort. For example, the count is increased by one. In another example, the count is updated by using a weighted increase, where the value of this increase can be a function of (e.g., equal to) of the similarity score.

In an example, the flow includes operation 950, where the computer system 130 determines a decision to block or not block a next content insertion for each cohort. For each cohort, the computer system 130 uses the count to determine the blocking decision. For example, if the count exceeds a maximum value, the decision is to block. Otherwise, the decision is to unblock.

The above flow can be repeated per content such that a set of content properties (e.g., the count and the decision) can be maintained over time per cohort and per content. Further, as explained herein above, an ML model can be used for at least a subset of the cohorts. Here, rather than maintaining the count for all the cohorts, the count for some of them is maintained and used to train the ML model. Thereafter, the ML model is used to predict the block/unblock decision for each of the remaining cohorts.

Figure 10:
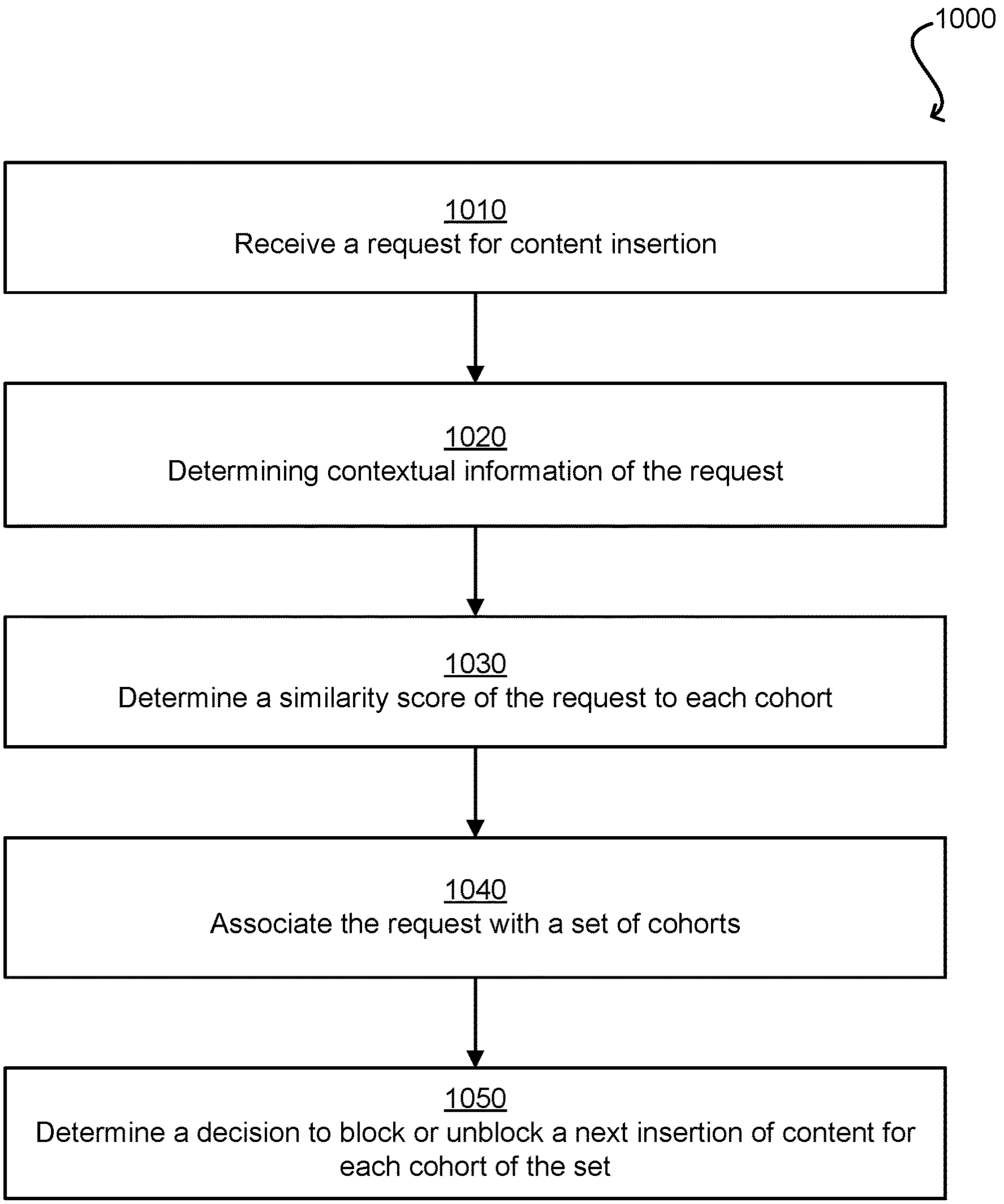
FIG. 10 illustrates an example flow of a process for determining whether to insert content in response to a request for content insertion, according to an embodiment of the present disclosure.

FIG. 10 illustrates an example flow of a process 1000 for determining whether to insert content in response to a request for content insertion, according to an embodiment of the present disclosure. Some or all of the processes (or any other processes described herein, or variations, and/or combinations thereof) may be performed under the control of one or more computer systems, such as the computer system 130 in FIG. 1, configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

In an example, the flow includes operation 1010, where the computer system 130 receives a request for content insertion. The content may be requested (e.g., by the web server 120 or an online service) to be inserted into a document (e.g., a web page). In some examples, the request contextual information.

In an example, the flow includes operation 1020, where the computer system 130 determines contextual information associated with the request. The contextual information can correspond to anonymous traffic or non-anonymous traffic.

In an example, the flow includes operation 1030, where the computer system 130 determines a similarity score of the request to each cohort. The computer system 130 determines the similarity score using techniques similar or identical to those described with respect to operation 930 of the process 900. For example, the computer system 130 accesses a graph or lattice-like structure, which may be stored in a depository (e.g., the data store 140) accessible by the computer system 130. The computer system 130 compares attributes values of the contextual information of the request to attributes values of each cohort to determine similarity scores between the request and the cohorts. If the similarity score to a cohort is larger than a threshold, this cohort is declared as a similar cohort (or a matched cohort).

In an example, the flow includes operation 1040, where the computer system 130 associates the request with a set of cohorts. This set can be the matched cohort(s).

In an example, the flow includes operation 1050, where the computer system 130 determines a decision to block or not block a next insertion of content for each cohort of the set of cohorts. Here, the computer system determines the content properties per matched cohort for the content associated with the request. A least misery approach or a block ratio approach can be used to generate the decision.

Storage and/or use of contextual information related to a particular person or device may be controlled by a user using privacy controls associated with a speech-controlled device and/or a companion application associated with a speech-controlled device. Accordingly, users may opt out of storage of contextual information and/or may select particular types of contextual information that may be stored while preventing aggregation and storage of other types of contextual information. Additionally, aggregation, storage, and use of contextual information, as described herein, may be compliant with privacy controls, even if not technically subject to them, to bolster user trust. For example, contextual and other information described herein may be treated as if it fell under acts and regulations, such as the Health Insurance Portability and Accountability Act (HIPAA) and the General Data Protection Regulation (GDPR), even if it does not actually fall under these acts and regulations.

Figure 11:
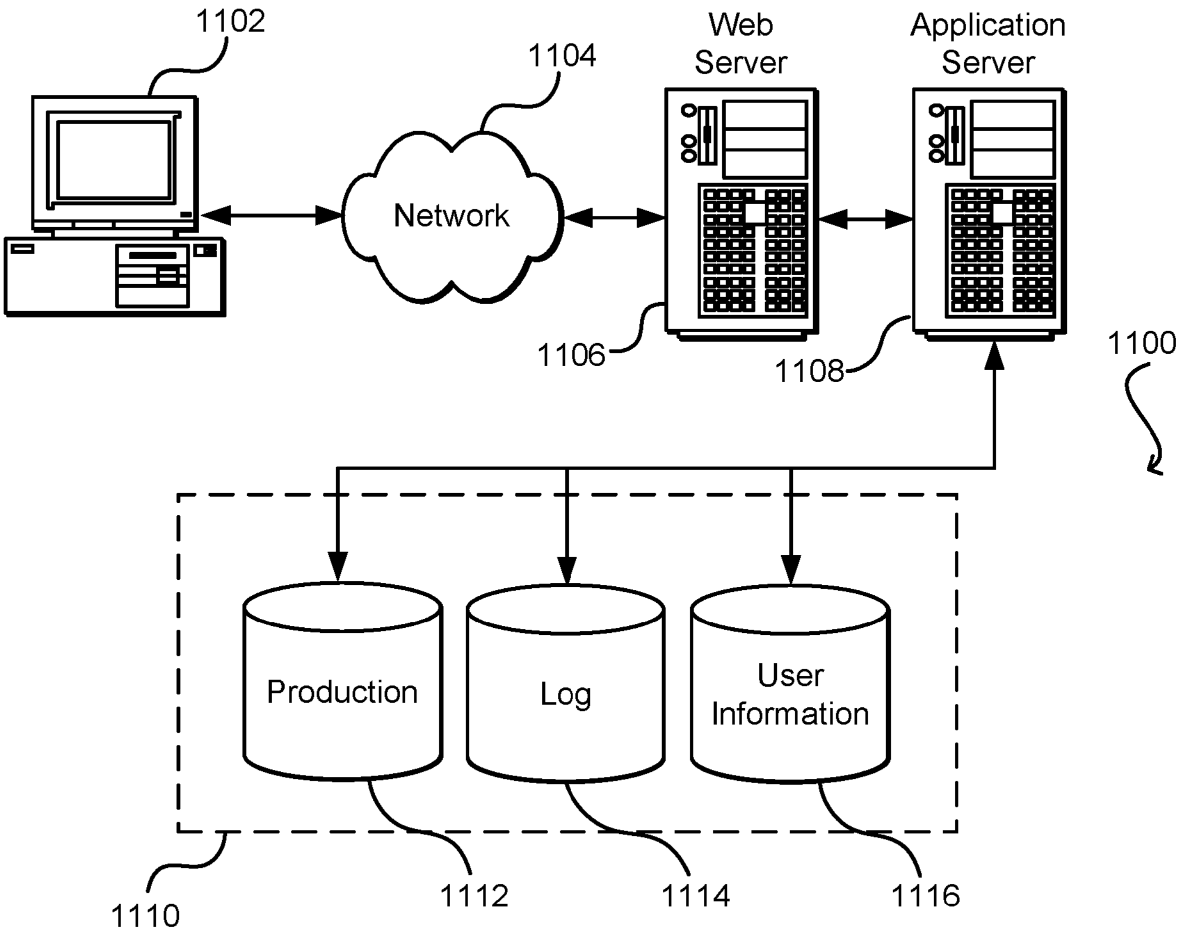
FIG. 11 illustrates aspects of an example environment for implementing aspects in accordance with various embodiments.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102 (e.g., an example of the user device 110), which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1106 (e.g., an example of the web server 120) for receiving requests and serving content in response thereto, although for other networks an alternative device serving a similar purpose could be used as would be apparent to one of ordinary skill in the art.

The illustrative environment includes at least one application server 1108 (e.g., an example of the computer system 130) and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the example environment 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Computer-readable storage media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:

one or more processors; and one or more memory storing instructions that, upon execution by the one or more processors, configure the system to:

receive a first request of a web server for first content insertion in a first web page to be presented at a first device of a user, the first request including first contextual information about first web traffic between the first device and the web server, the first contextual information excluding an identifier of the user based at least in part on the first web traffic being anonymous;

generate a plurality of cohorts, a first cohort of the plurality of cohorts comprising a set of previous content insertion requests that have a common set of attribute values, the set of previous content insertion requests associated with the web server;

determine that the first request has the common set of attribute values;

associate, based at least in part on the first request and the first cohort having the common set of attribute values, the first request with the first cohort;

determine a first property of the first cohort, the first property indicating at least one of a first count of first content previously inserted or a first decision to block or unblock a future insertion of the first content;

determine that the first content can be inserted in the first web page based at least in part on the first property of the first cohort; and send, to the web server in response to the first request, a first indication to insert the first content in the first web page, the first indication causing the first content to be shown in the first web page upon presentation at the first device.

2. The system of claim 1, wherein the one or more memory store further instructions that, upon execution by the one or more processors, configure the system to:

receive a second request of the web server for second content insertion in a second web page to be presented at a second device, the first request including the identifier;

associate the second request with a second cohort of the plurality of cohorts;

determine that a second property of the second cohort indicates that insertion of second content is to be blocked; and send, to the web server in response to the second request, a second indication corresponding to the insertion of the second content in the second web page being blocked.

3. The system of claim 2, wherein the first indication and the second indication are generated by using a same content insertion model for anonymous and non-anonymous web traffic, wherein the same content insertion model uses a cohort variable, a content variable, and a timing variable.

4. The system of claim 1, wherein the one or more memory store further instructions that, upon execution by the one or more processors, configure the system to:

associate the first request with a second cohort of the plurality of cohorts;

determine a second property of the second cohort indicating that insertion of the first content is to be blocked; and determine, based at least in part on the first property of the first cohort indicating that the insertion is permitted and based at least in part on the second property of the second cohort, that the first content is to be inserted in the first web page.

5. A computer-implemented method comprising:

receiving a request of a computer system for content insertion in a document to be presented at a device, the request including contextual information about anonymous traffic between the device and the computer system;

generating a plurality of cohorts, a cohort of the plurality of cohorts comprising a set of previous content insertion requests that have a common set of attribute values, the set of previous content insertion requests associated with the computer system;

determining that the request has the common set of attribute values;

associating, based at least in part on the request and the cohort having the common set of attribute values, the request with the cohort;

determining that content can be inserted in the document based at least in part on a content property of the cohort; and sending, to the computer system, an indication to insert the content in the document.

6. The computer-implemented method of claim 5, wherein the cohort and the common set of attribute values are a first cohort and a first set of attributes, respectively, and wherein the computer-implemented method further comprises:

determining a first similarity score between a first previous content insertion request and the cohort based at least in part on a second set of attribute values of the request and the first set of attribute values characterizing the first cohort, wherein the request is associated with the first cohort based at least in part on the first similarity score.

7. The computer-implemented method of claim 6, further comprising:

determining a second similarity score between the request and a second cohort of the plurality of cohorts based at least in part on the second set of attribute values of the request and a third set of attribute values characterizing the second cohort;

associating the request is associated with the second cohort based at least in part on the second similarity score; and determining that the content can be inserted in the document based at least in part on a content property of the second cohort.

8. The computer-implemented method of claim 5, wherein the common set of attribute values is a first set of attributes, and wherein the computer-implemented method further comprises:

determining a first similarity score between a first previous content insertion request for the content and the cohort based at least in part on a second set of attribute values of the first previous content insertion request and the first set of attribute values characterizing the cohort;

determining a second similarity score between a second previous content insertion request for the content and the cohort based at least in part on a third set of attribute values of the second previous content insertion request and the first set of attribute values characterizing the cohort;

generating a request count based at least in part on a size of the set of previous content insertion requests, the first similarity score, and the second similarity score; and associating the request count with the cohort, wherein the content property indicates the request count.

9. The computer-implemented method of claim 8, further comprising:

generating a decision to block or unblock a future insertion of the content based at least in part on the request count and a maximum allowable number of inserting the content within a time period; and adjusting the common set of attributes to include the decision, wherein the content property indicates the decision.

10. The computer-implemented method of claim 5, further comprising:

associating the request with the cohort only or with the plurality of cohorts based at least in part on a maximization of a similarity function between attribute values of the request and a corresponding set of attribute values per cohort.

11. The computer-implemented method of claim 5, wherein the cohort is a member of a set of cohorts associated with the request, and wherein the computer-implemented method further comprises:

determining a subset of cohorts of the set of cohorts, wherein each cohort of the subset is associated with a decision to block insertion of the content;

determining a ratio of the subset of cohorts over a size of the set of cohorts; and determining that the content can be inserted in the document based at least in part on a comparison of the ratio and a threshold value.

12. The computer-implemented method of claim 5, wherein the cohort is a member of a set of cohorts associated with the request, and wherein the computer-implemented method further comprises:

determining that none of members of the set of cohorts indicates that insertion of the content is to be blocked.

13. One or more non-transitory computer-readable storage media storing instructions that, upon execution on a system, cause the system to perform operations comprising:

receiving a request of a computer system for content insertion in a document to be presented at a device, the request including contextual information about anonymous traffic between the device and the computer system;

generating a plurality of cohorts, a cohort of the plurality of cohorts comprising a set of previous content insertion requests that have a common set of attribute values, the set of previous content insertion requests associated with the computer system;

determining that the request has the common set of attribute values;

associating, based at least in part on the request and the cohort having the common set of attribute values, the request with the cohort;

determining that content can be inserted in the document based at least in part on a content property of the cohort; and sending, to the computer system, an indication to insert the content in the document.

14. The one or more non-transitory computer-readable storage media of claim 13 storing further instructions that, upon execution on the system, cause the system to perform additional operations comprising:

generating the plurality of cohorts based at least in part on a history of previous content insertion requests;

determining, for the content and per cohort, at least one of a request count or a decision to block or unblock insertion of the content; and associating each cohort with the at least one of the request count or the decision corresponding to the cohort.

15. The one or more non-transitory computer-readable storage media of claim 13, wherein the contextual information indicates a context of at least one of the device, an application executing on the device and associated with presenting the document, the computer system, or a type of the document.

16. The one or more non-transitory computer-readable storage media of claim 13 storing further instructions that, upon execution on the system, cause the system to perform additional operations comprising:

generating, based at least in part on a history of previous content insertion requests, a graph that represents the plurality of cohorts, wherein the cohort is represented as a node in the graph, and wherein the request is associated with the node.

17. The one or more non-transitory computer-readable storage media of claim 16, wherein the graph has a lattice structure that includes a single top node, a single bottom node, and nodes between the single top node and the single bottom node.

18. The one or more non-transitory computer-readable storage media of claim 17, wherein the graph is generated by at least:

determining absurdity of a first node based at least in part on a count of previous content insertion requests associated with the first node being smaller than a threshold value; and removing, from the graph based at least in part on the absurdity, the first node and a second node that is child of the first node.

19. The one or more non-transitory computer-readable storage media of claim 16 storing additional instructions that, upon execution on the system, cause the system to perform further operations comprising:

associating the node that represents the cohort with a count of previous insertions of the content and a decision to block or unblock a next insertion of the content, wherein the content property indicates at least one of the count or the decision.

20. The one or more non-transitory computer-readable storage media of claim 13, wherein the cohort and the content property are a first cohort and a first content property, respectively, and wherein one or more non-transitory computer-readable storage media store further instructions that, upon execution on the system, cause the system to perform additional operations comprising:

generating an input to a machine learning model based on a second content property of a second cohort; and determining a decision to unblock or block a next insertion of the content based at least in part on an output of the machine learning model in response to the input, wherein the content property indicates the decision.

* * * * *